April 27, 1943.  J. D. RYDER  2,317,807
TELEMETRIC SYSTEM
Filed Feb. 13, 1940  2 Sheets-Sheet 1

Inventor
JOHN D. RYDER
By Raymond W. Junkins
Attorney

April 27, 1943.    J. D. RYDER    2,317,807
TELEMETRIC SYSTEM
Filed Feb. 13, 1940    2 Sheets-Sheet 2

Inventor
JOHN D. RYDER
By Raymond W. Junkins
Attorney

Patented Apr. 27, 1943

2,317,807

UNITED STATES PATENT OFFICE 2,317,807

TELEMETRIC SYSTEM

John D. Ryder, Cleveland Heights, Ohio, assignor to Bailey Meter Company, a corporation o. Delaware Application February 13, 1940, Serial No. 318,699

12 Claims. (Cl. 172—239)

This invention relates to telemetric systems for transmitting measurements of a variable taken at a distant point to a local point. The measurements of the variable may be exhibited at the local point as by recording and/or indicating or they may be used to control the variable or a related variable. The variable may be any measurable quantity or condition, such as rate of fluid flow, temperature, electromotive force, humidity or position.

In accordance with my invention a change in the quantity or condition effects an unbalance of a balanceable induction bridge circuit and the potential resulting from such unbalance controls suitable relay means for restoring the bridge to balanced condition. More specifically, in accordance with my invention the potential due to bridge unbalance selectively renders one or the other of a pair of electron discharge devices conducting, depending upon the sense of bridge unbalance, and the electron discharge devices in turn control the starting, stopping and direction of movement of suitable means for rebalancing the bridge whereby the position of the latter becomes a measure of the variable.

The potential due to unbalance of the bridge circuit is used merely as a means of electrically detecting such unbalance and is not required to operate mechanical detector devices such as galvanometers, polar relays, or the like. Accordingly, my telemetric system inherently possesses a high degree of sensitivity as the inertia and friction found in any mechanical device is eliminated. Furthermore by utilizing the potential due to bridge unbalance merely to electrically detect such unbalance I eliminate the necessity for any periodically actuated feeler mechanism which is customarily used when delicate mechanical detectors, such as the aforesaid galvanometers, polar relays, or the like, are employed. It therefore follows that my telemeter is of the type commonly known as "high speed," as the receiver or receivers immediately respond to any change in the magnitude of the variable and will accurately exhibit not only changes in the variable as and after they have occurred; but the rate of change in the variable as well.

Figure 1:
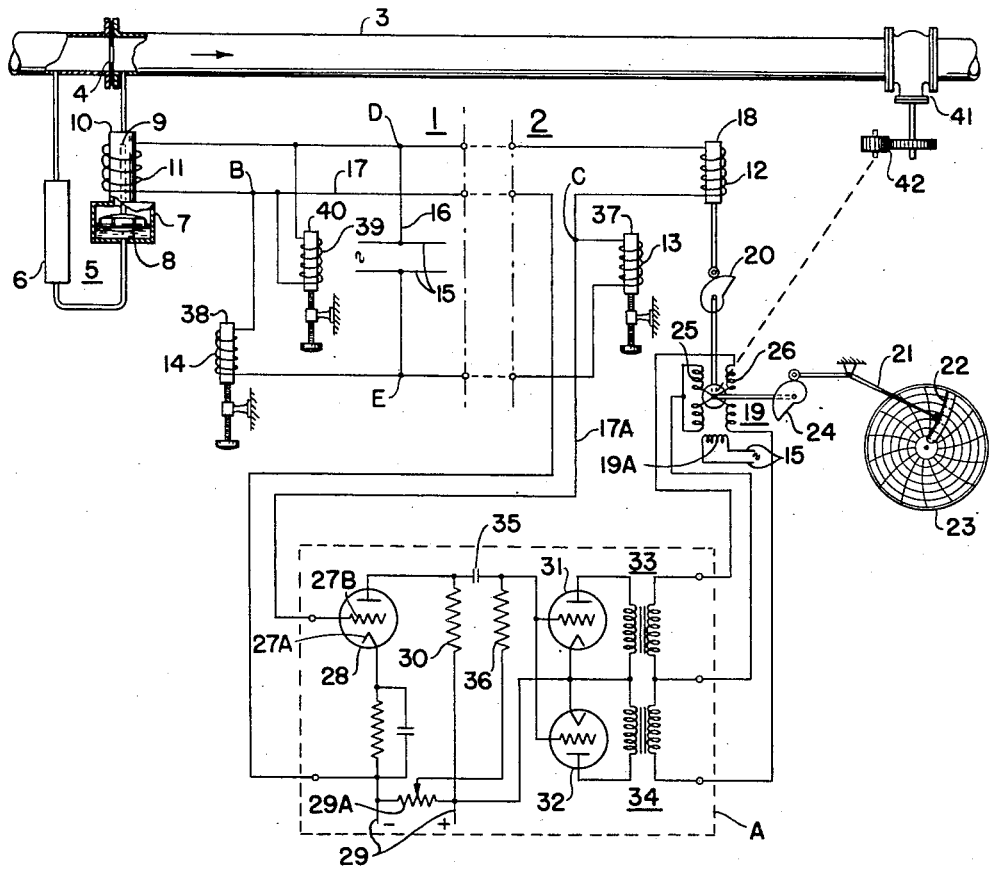
Fig. 1 illustrates diagrammatically a specific embodiment of my invention.

In Fig. 1 I have taken a fluid rate of flow as a typical variable and illustrated my invention as adapted to telemeter such rate from a point of measurement at a transmitting station 1 to a remotely located receiving station generally indicated at 2. Positioned in a conduit 3 through which the fluid, the rate of flow of which is to be measured, flows, is a restriction such as an orifice 4 producing a differential pressure varying in funtional relation to the rate of fluid flow. Connected across the orifice is a U-tube 5 having legs 6 and 7 in which is a suitable sealing liquid such as mercury which will be displaced from one leg to the other until the difference in height in the two legs corresponds to the differential pressure. Disposed in the leg 7 is a float 8 vertically positioned in response to changes in the height of mercury in the leg. Carried by the float 8 is a core piece 9 fabricated of a magnetic material, such as iron or ordinary carbon steel.

The core piece 9 is enclosed in a pressure tight cylindrical housing or casing 10 made of a nonmagnetic material such as brass or a so-called stainless steel usually being a metallic alloy containing substantial amounts of nickel and chromium. Surrounding the casing 10 is an inductive coil 11 connected in one arm of an induction bridge, in the other arms of which are disposed similar coils 12, 13 and 14. The bridge is energized from a suitable source of alternating current 15 which is connected in a conjugate conductor 16 connecting points D and E of the bridge. The induction coils 11 and 14 located in the transmitter; and the coils 12 and 13 located in the receiver, are connected in series across the source of alternating current potential 15.

The coil 12 is provided with a movable magnetic core 18 positioned by a motor 19 through a cam 20. When the bridge is in balance the potential at the point B will be equal to and in phase with that at the point C. This condition will exist when the position of the core piece 18 corresponds to that of the core piece 9. Assuming that there is a change in the position of the core piece 9 the bridge will become unbalanced and a potential will exist between the points B and C. The phase of this potential will depend upon the sense of unbalance of the bridge. Assuming, for example, that the core piece 9 is positioned so as to increase the inductance of the coil 11, then a potential of one phase will exist between points B and C. If, however, the core piece 9 is positioned to decrease the inductance of the coil 11 then a potential of opposite phase will exist between the points B and C. In other words, it may be said that the induction bridge operates to produce a potential between points B and C having a phase depending upon the sense of change in position of the core piece 9, which change in position is caused by a change in the rate of flow through the conduit 3.

By means now to be described such potential between points B and C effects selective operation of the motor 19 to position the core piece 18 relative to the coil 12 to vary the inductance thereof and restore the bridge to balance. The movement of the core piece 18 necessary to restore the bridge to balance will correspond to the original movement of the core piece 9 in unbalancing the bridge and hence the position of the core piece 18 may be taken as a measure of the rate of flow of fluid through the conduit 3. Accordingly, I can, as illustrated, utilize the motor 19 to position an index 21 relative to a graduated scale 22 and chart 23 rotated by a suitable clock mechanism, (not shown) to indicate and record the rate of fluid flow through the conduit 3. Preferably the index 21 is positioned by the motor 19 through a suitable cam 24 for reasons which will be disclosed more in detail hereinafter.

The motor 19 is shown as being of the type having a continuously energized alternating current field winding 19A and opposed shading pole windings 25 and 26. When the windings 25 and 26 are open circuited, or both effectively short circuited, the motor 19 remains stationary. When the pole winding 25 is effectively energized by being short circuited the motor 19 rotates in one direction, and when the winding 26 is effectively energized by being short circuited the motor rotates in opposite direction. The field winding 19A is energized from the alternating current source 15.

In order that a potential of one phase between points B and C will cause effective short circuiting of the pole winding 25 and a potential of opposite phase will cause effective short circuiting of the winding 26, I employ an amplifying and control circuit disclosed in my prior application, Serial No. 251,388, filed in the United States Patent Office on January 17, 1939, now Patent No. 2,275,317. In the embodiment of my invention, shown in Fig. 1, I have shown the amplifying and control circuit in detail, and will so describe the same. In the other embodiments of my invention illustrated I have schematically illustrated the amplifying and control circuit and will refer to it as "amplifier A."

The potential between the points B and C controls the input circuit of an electron discharge device 28. As shown, the point B is connected by a conductor 17 to the cathode 27A and the point C by a conductor 17A to the grid 27B of the device 28. The output circuit of the device 28 is shown as including a source of direct current 29 and a resistance 30. With the induction bridge in balance so that no potential exists between points B and C a direct current having no pulsating component may or may not flow through the output circuit of the device 28 depending upon its characteristics and bias of the grid 27B. Assuming now that because of bridge unbalance an alternating current potential exists between points B and C, the current in the output circuit of the device 28 will become pulsating in character. The amplitude of the pulsations will depend upon the amount of unbalance of the induction bridge and the phase of the pulsations will depend upon the sense of unbalance of the induction bridge.

The pulsating current passing through the output circuit of the device 28 is utilized to control the current transmission through a second pair of electron discharge devices 31 and 32, the output circuits of which are inductively coupled through transformers 33 and 34 to the circuits of the pole windings 26 and 25 respectively. Such direct current as may normally flow through the output circuit of the device 28 will have no effect upon the potential impressed upon the grids of the devices 31 and 32 by virtue of a condenser 35. Any pulsating component of the current in the output circuit of the device 28 will pass through the condenser 35, however, and render either the device 31 or 32 conducting selectively in accordance with the phase of the potential between points B and C.

The devices 31 and 32 may normally be maintained non-conducting by connecting their grids through a resistance 36 to a suitable point on a voltage divider 29A spanning the source 29. To provide a high degree of sensitivity, in some cases it may be preferable to maintain the devices 31 and 32 normally conducting a relatively small amount, which may also be accomplished by connecting their grids to a suitable point on the divider 29A. In the latter case a pulsating current originating due to unbalance of the induction bridge will selectively render one or the other of the devices 31 and 32 more conducting and the other less conducting.

Selective control of the devices 31 and 32 is obtained by arranging them to have opposite polarity. That is, when the anode of the device 31 is positive, the anode of the device 32 is negative, and vice versa. The pulsating current in the output circuit of the device 28 caused by an unbalance of the induction bridge has a phase depending upon the sense of unbalance of the bridge. Thus upon the induction bridge being unbalanced in one sense the pulsating current will render the grid of the device 31 more positive with respect to its cathode during the same half cycle that its anode is positive, and hence the device will be rendered conducting. Conversely if the bridge is unbalanced in opposite sense the pulsating current in the output circuit of the device 28 will be in phase with the voltage in the output circuit of the device 32, and hence will render the grid thereof more positive with respect to its cathode during the same half cycle that its anode is positive, and hence the device will be rendered conducting. During the half cycles when the anodes of the devices 31 and 32 are negative with respect to their cathodes, the devices are of course non-conducting regardless of the potential of their grids.

When either the device 31 or 32 is rendered conducting, thereby short circuiting the secondary of the transformer 33 or 34 respectively, the impedance of the circuits of the pole windings 26 and 25 is sufficiently reduced to effect rotation of the motor 19 in one direction or the other. Such rotation as heretofore described positions the index 21 relative to the scale 22 and chart 23, and simultaneously positions the magnetic core piece 18 relative to the coil 12 to restore the induction bridge to balance.

As known, the differential pressure produced by a restriction such as the orifice 4 varies in non-linear relation to the rate of flow of fluid. As it is usually desirable to have the exhibiting mechanism, such as the index 21, positioned in linear relation to rate of fluid flow rather than to differential pressure, it is necessary to provide a means for extracting the non-linear functional relation existing between differential pressure and rate of fluid flow. The cams 20 and 24 provide a convenient means for accomplishing this for by properly shaping either or both of the cams the movement of the index 21 relative to that of the core piece 18 in restoring the bridge to balance may be made such that the index 21 will be positioned in linear proportion to changes in rate of fluid flow. In some instances I may find it desirable or possible to dispense with either the cam 20 or 24 and properly compensate by means of a single cam, as will be apparent to those skilled in the art. Frequently however the non-linear function existing between the variable and the measurable effect produced by that variable will be such as to give an undesirable cam shape in completely compensating for this non-linear relation by means of a single cam. The use of the two cams affords the possibility of materially improving the cam shape while compensating for the given non-linear functional relation.

The coils 13 and 14 are shown provided with manually adjustable core pieces 37 and 38. I find that the adjustable core pieces 37 and 38 provide a convenient means for originally bringing the induction bridge to balance, so that notwithstanding that the usual variations in number of turns and m. m. f. produced by the coils 11 and 12 may be present, the bridge may be readily brought to initial balance.

While the maximum capacity of the device shown in Fig. 1, that is the rate of fluid flow which will cause the index 21 to be positioned to the maximum graduation of the scale 22 and chart 23 may be varied by changing the area of the orifice 4 or relative areas of the legs 6 and 7 of the U-tube, such changes in practice are inconvenient and at times impossible to expeditiously accomplish. Accordingly, to provide a ready means of varying the so-called max. capacity of the device I provide a coil 39 connected in parallel with the coil 11 and having a manually adjustable core piece 40. Adjustment of the core piece 40 varies the inductance of the coil 39 and hence varies the impedance of the arm of the induction bridge including coils 11 and 39. A given movement of the core piece 9 will thus produce a greater or less change in the inductance of the arm depending upon the adjustment of the core piece 40. Thus with the core piece 40 in one position a relatively small movement of the core piece 9 will be sufficient to cause the index 21 to be positioned from zero to max. graduation, whereas with the core piece 40 in another position a relatively large movement of the core piece 9 will be required to produce the same motion of the index 21. While I have illustrated the coil 39 connected in parallel with the coil 11 it is evident that if preferable it may be connected in parallel with either the coil 12, 13 or 14 and the same result accomplished.

In Fig. 1 I additionally illustrate my invention arranged to control the rate of fluid flow through the conduit 3 to maintain the same at some predetermined desired value. The motor 19 is shown as being adapted to position a valve 41 through suitable gears 42. The connection between the motor 19 and gears 42 is shown schematically, it being apparent that suitable shafting, cables, or the like may be employed. As the motor 19 operates in one direction or the other in correspondence with variations in the rate of fluid flow the valve 41 will be proportionately positioned to restore the rate of fluid flow to that desired. In the arrangement shown in Fig. 1 the rate of fluid flow through the conduit 3 is simultaneously exhibited and controlled. It will be apparent that in any particular adaptation of the invention the rate of fluid flow may be controlled without exhibiting the same, or vice versa.

Figure 2:
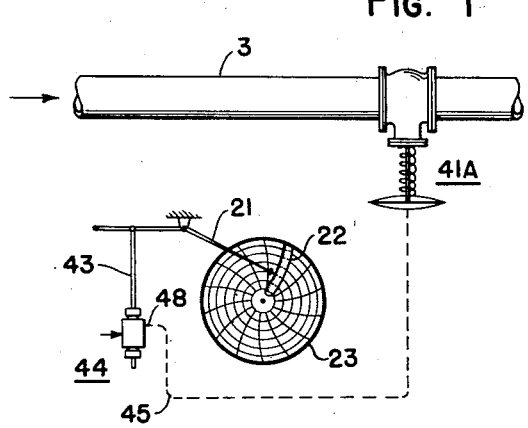
Fig. 2 is a fragmentary view illustrating a modified form of the control shown in Fig. 1.

In place of having the motor 19 mechanically position the valve 41 I further contemplate having the rate of fluid flow controlled by the motor 19 through a fluid pressure operated control mechanism. In Fig. 2, by way of example, I have shown the index 21 adapted to position the movable valve member 43 of a pilot valve 44 to establish a fluid pressure proportional to the position of the index 21. The fluid pressure so established may be conveniently transmitted through a pipe 45 to a fluid pressure operated valve 41A. The arrangement may be such that as the valve member 43 is positioned downwardly upon an increase in the rate of fluid flow, the fluid pressure established by the pilot valve 44 will decrease proportionately, effecting a proportionate closure of the valve 41A, thus decreasing the rate of fluid flow through the conduit 3 and restoring the same to the desired value.

Figure 3:
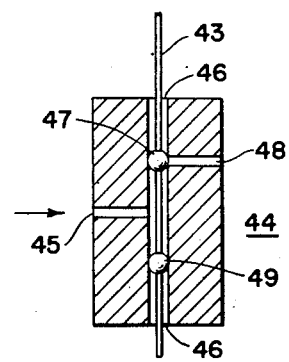
Fig. 3 illustrates in cross section and to larger size a pneumatic pilot valve shown in Fig. 2.

The pilot valve 44 may be of any suitable type, such as will establish or produce a variation in fluid pressure upon movement of the index 21 from that position corresponding to the desired rate of fluid flow through the conduit 3. By way of illustration I have shown in Fig. 3. in cross section and to larger size, a suitable pilot valve. In the type disclosed in Fig. 3 air under pressure is admitted through a port 45 to a cylindrical passageway 46 running longitudinally through the valve body. The movable valve member 43 carries a land 47 positioned adjacent an outlet port 48. The air under pressure in flowing past the land 47 establishes a pressure gradient, so that the pressure established at the outlet port 48 and transmitted to the valve 41A will depend upon the position of the valve member 43. Thus upon the valve member 43 being positioned upwardly the pressure established in the outlet port 48 will increase proportionately. The valve member 43 may be provided with a lower land 49 in order to balance the axial forces acting on the valve member. The particular pilot valve I have illustrated in Fig. 3 is merely illustrative of one type that I may employ, as it will be evident that other types of fluid pressure pilot valves known in the art may be readily substituted for the specific form shown and described.

Figure 4:
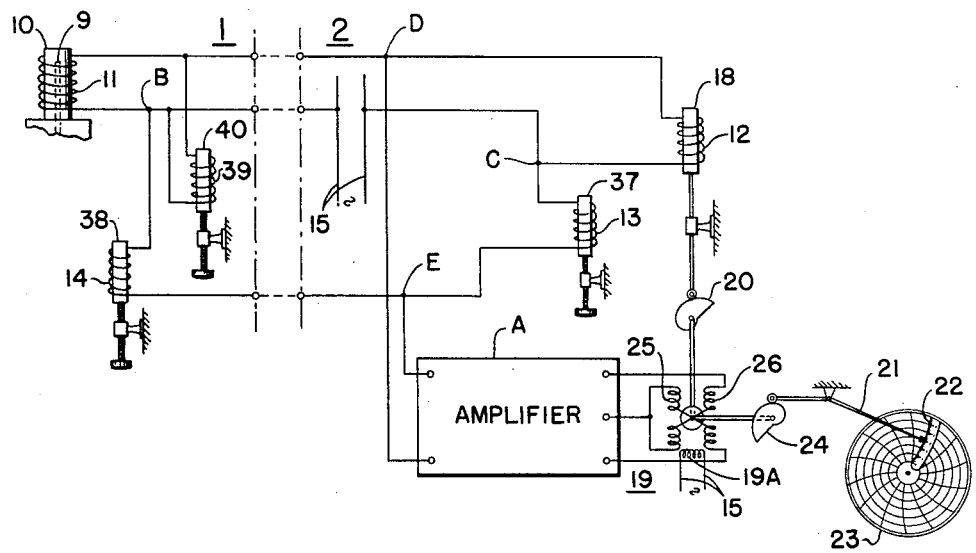
Fig. 4 shows a modified form of circuit arrangement.

In the embodiment of my invention shown in Fig. 1 the source 15 is connected in the conjugate conductor 16 and the amplifier A arranged to detect a potential between points B and C. With this arrangement the coils 11 and 14 are connected in series across the source 15 as are the coils 12 and 13. In Fig. 4 I show a modified bridge arrangement wherein the source 15 and amplifier A are interchanged. It will be observed that with this arrangement the coils 11 and 12 are connected in series across the source 15 as are the coils 13 and 14, and the amplifier A is arranged to detect a potential between points D and E. The operation of the modification of my invention shown in Fig. 4 is similar to the operation of the modification shown in Fig. 1. Unbalance of the bridge caused by a change in position of the core piece 9 produces a potential between points D and E having a phase depending upon the sense of unbalance of the bridge. Such potential, by means of the amplifier A operates the motor 19 to restore the bridge to balance by movement of the core piece 18.

Figure 5:
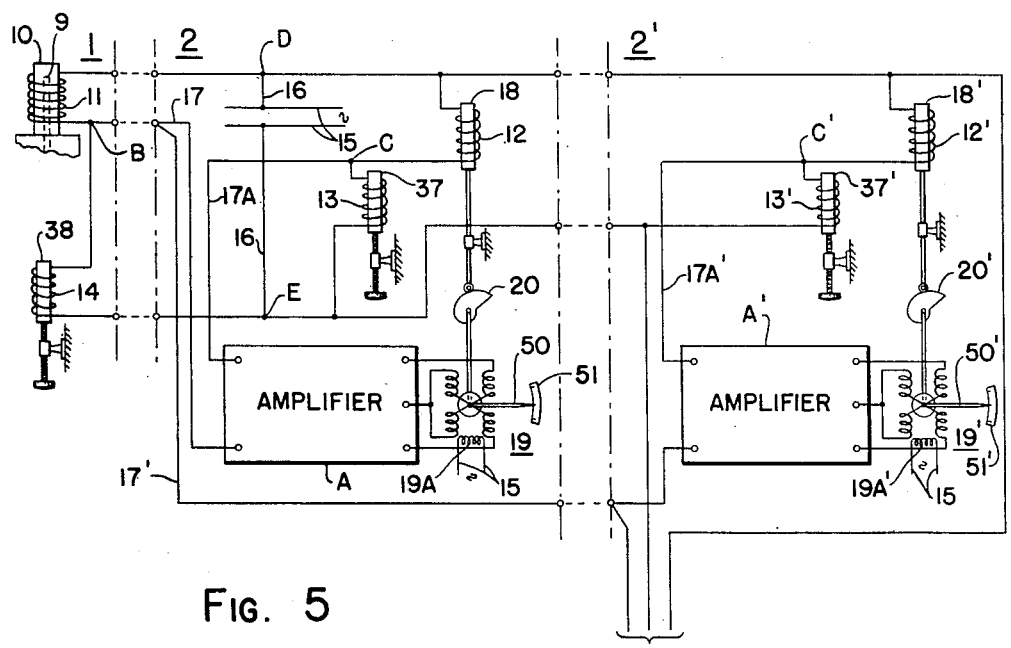
Fig. 5 illustrates an arrangement for operating a plurality of receivers located at points remote from each other and from the transmitter.

In Fig. 5 I show my invention arranged to exhibit the magnitude of a variable at a plurality of receiving stations, 2, 2' remote from each other and from the transmitting station 1. The receiving stations are identical, the elements in the second receiving station 2' corresponding to the elements found in the first receiving station 2 being indicated by the same reference character followed by a prime.

By way of simplification I have shown the motors 19, 19' arranged to position indexes 50, 50' respectively cooperating with scales 51, 51' to indicate the position of the core piece 9 relative to the coil 11. It is evident, if desired, that the same exhibiting arrangement shown in Fig. 1 might be used, or any other arrangement, to give a visual indication in desired form of the variable being measured.

The coils 12', 13' are connected in series with each other and in parallel with the coils 12, 13. The amplifier A is controlled by the potential between points B and C and the amplifier A' by the potential between points B and C'. Inasmuch as the amplifiers A and A' are controlled solely by the potential between these points and draw no current an unbalance of the bridge circuit including coils 11, 14, 12 and 13 does not affect the operation of the bridge circuit which includes coils 11, 14, 12' and 13'. Thus each receiver acts independently of all other receivers, yet each is controlled by the single transmitter 1. In Fig. 5, by way of example, I have shown two receivers. I have however indicated how further receivers may be connected into the circuit. It is apparent that the arrangement is not limited to the exact number of receivers shown, but may be extended to include any desired number.

In accordance with the patent statutes I have described certain specific embodiments of my invention. They should however be taken as merely illustrative and not as defining the scope of my invention.

What I claim as new, and desire to secure by Letters Patent of the United States, is:

1. A telemetric system comprising an alternating current induction bridge having a conjugate conductor and a plurality of arms each including a winding and a separate movable magnetic element for independently varying the inductance of each winding, means responsive to the magnitude of a variable for positioning one of said elements to unbalance said bridge, a motor having opposed windings, one of said windings disposed to effect, when energized, forward rotation of the motor and the other of said windings when energized disposed to effect reverse operation of said motor, another of said magnetic elements positioned by said motor to vary the inductance of the associated coil, and means to control the operation of said motor to cause said second element to be positioned to rebalance said bridge after unbalance thereof by movement of said first element comprising; a pair of electron discharge devices each arranged to control the energization of a different one of said windings, a source of alternating current for energizing said windings, the plates of said devices arranged to be positive during successive half cycles of said alternating current and means electrically coupling the input circuits of said electron discharge devices with said conjugate conductor so that said devices are selectively controlled in accordance with the phase of the potential in the conjugate conductor.

2. A telemetric system comprising an alternating current induction bridge having a plurality of arms each including an induction coil and a movable magnetic element for varying the inductance of the winding, a source of alternating current for energizing the bridge, means responsive to the magnitude of a variable for positioning one of said elements to unbalance said bridge and set up a potential between selected points of said bridge, an alternating current motor having a continuously energized alternating current field, a rotor, and wire-wound shading coils on the pole pieces, one of said coils disposed to effect, when energized, forward rotation of the motor and the other of said coils disposed to effect, when energized, reverse rotation of the motor, another of said elements positioned by said motor to vary the inductance of the associated coil, and means to control the operation of said motor to cause said second element to be positioned to rebalance said bridge, comprising, a pair of electron discharge devices each having a plate, a grid and a cathode, means including a transformer coupling the wire wound shading coils of the motor to the respective plates of the thermionic devices, said electron discharge devices arranged so that the respective plates thereof are positive during succeeding half cycles of the alternating current supplied the plates from the wire wound shading coils of the motor and the grids during said half cycles negative so that said electron discharge devices are not conducting, and means coupling the grids of said electron discharge devices to said points on said bridge so that when a potential exists between said points the grid of one or the other of said electron discharge devices is rendered less negative during the half cycle that its plate is positive depending upon the phase of the said potential and said device rendered conducting so that the wire wound shading coils coupled to the plate of said device is effectively energized and said motor rotated in predetermined direction to position said second element to rebalance said bridge.

3. A telemetric system comprising, an alternating current induction bridge having a plurality of arms each including a winding and a movable magnetic element for varying the inductance of the winding, a source of alternating current for energizing the bridge, means for positioning one of said elements to unbalance said bridge and thereby set up a potential between diagonally opposite points of said bridge having a predetermined phase relative to said source upon unbalance of said bridge in one sense and opposite phase upon unbalance of said bridge in opposite sense, means connected in parallel with the winding of one arm of the bridge for determining the maximum potential difference between said points resulting from a given movement of said one element, electromagnetic means for positioning another of said elements to vary the impedance of the associated winding and thereby rebalancing said bridge, and means electrically coupled to said diagonally opposite points for controlling said electromagnetic means.

4. In a telemetric system, in combination, an induction bridge having a pair of inductance coils connected in series across a source of alternating current at a transmitting point and a similar pair connected in series across said source of alternating current at each of a plurality of remote points, separate conjugate conductors connecting the adjacent ends of the pair of coils at the transmitter with the corresponding ends of the respective pairs of coils at each of said remote points, means for varying the relative inductance of the pair of coils at the transmitting point to unbalance the bridge and thereby produce an alternating current potential in each of said conjugate conductors varying in phase and amplitude in accordance with the sense and amount, respectively, of said variation in relative inductance, means connected in series in each conjugate conductor and responsive to current flow therein for generating electrical impulses varying in phase and amplitude in accordance with the amount and sense, respectively, of bridge unbalance, and means responsive to the electrical impulses generated by the respective generators for varying the relative inductance of the pairs of coils connected to the respective conjugate conductors at said remote points to eliminate the potential in said conjugate conductors and hence maintain said bridge in balance.

5. In a telemetric system, in combination, an induction bridge having a pair of induction coils connected in series across a source of alternating current at a transmitting point, a first similar pair of coils connected in series across said source of alternating current at a first receiving point, a second similar pair of coils connected in series across said source of alternating current at another receiving point, a first conjugate conductor connecting the adjacent ends of the pair of coils at the transmitting point with the corresponding ends of the pair of coils at the first receiving point, detector means in said conjugate conductor for detecting unbalance in the relative inductance of the pair of coils located at the transmitting point and at the first receiving point, a second conjugate conductor connected to said first conjugate conductor at a point at the side of said detector remote from said first pair of receiver coils and to the adjacent ends of said second similar pair of coils, and a detector in said second conjugate conductor for detecting unbalance in the relative inductance of the pair of coils located at the transmitting point and at said second receiving point.

6. A control system comprising an alternating current induction bridge having a plurality of arms each including a winding and a movable magnetic element for varying the inductance of the winding, means responsive to the magnitude of a variable for positioning one of said elements to unbalance said bridge quantitatively in correspondence with the amount of movement of said element, an auxiliary winding connected in parallel with said last named winding, an adjustable magnetic element associated with said auxiliary winding for varying the inductance thereof so that the amount of unbalance of said bridge resulting from a given movement of said one of said elements is controllable, and means responsive to unbalance of said bridge for positioning another of said elements to rebalance said bridge.

7. A control system, comprising an alternating current induction bridge having a plurality of arms each including a winding and a movable magnetic element for varying the inductance of the winding, means responsive to the magnitude of a variable for positioning one of said elements to unbalance said bridge, means responsive to unbalance of said bridge for positioning another of said elements to rebalance said bridge, an auxiliary winding connected in parallel with one of said windings, and an adjustable magnetic element associated with said auxiliary winding for varying the inductance thereof.

8. A control system, comprising an alternating current induction bridge having a plurality of arms each including a winding and a separate movable magnetic element for varying the inductance of the winding, adjustable means for positioning one of said elements, means responsive to the magnitude of a variable for positioning another of said elements to unbalance said bridge, means responsive to unbalance of said bridge for positioning another of said elements to rebalance said bridge, an auxiliary winding connected in parallel with the winding in one of the arms of said bridge, and an adjustable magnetic element associated with said auxiliary winding to vary the inductance thereof.

9. A control system comprising an alternating current induction bridge having a plurality of arms each including an inductance unit, at least one of said units including a winding having a movable magnetic member inductively associated therewith, means for moving the magnetic member with respect to the winding to unbalance the bridge, an auxiliary winding connected in parallel with said first-mentioned winding and an adjustable magnetic member inductively associated with the auxiliary winding for varying the inductance thereof so that the amount of unbalance of the bridge resulting from a given movement of said first-mentioned magnetic member may be controlled.

10. A control system comprising an alternating current induction bridge having a plurality of arms each including an inductance unit, at least one of said units including a winding having a movable magnetic member inductively associated therewith, means for moving the magnetic member with respect to the winding to unbalance the bridge, a relay connected to conjugate points of the bridge and energized by the current due to the potential difference existing at said points when the bridge is unbalanced, and means for controlling the magnitude of said potential difference in response to a given movement of said magnetic member comprising an adjustable inductance connected in parallel with said winding.

11. In a telemetric system, in combination, an inductance bridge network including a pair of inductance coils connected in series across a source of alternating current potential at a transmitting station, a second pair of inductance coils connected in series across said source at a first receiving station, a third pair of inductance coils connected in series across said source at a second receiving station, a first bridge unbalance detector connected across the conjugate points of the bridge defined by the first and second pair of inductance coils, a second bridge unbalance detector connected across the conjugate points of the bridge defined by the first and third pair of inductance coils, movable means at the transmitting station for varying the relative inductance of the coils of the first pair of coils to unbalance the bridge network, and means at the several receiving stations responsive to the respective detectors for correspondingly varying the relative inductance of the coils of the second and of the third pair of coils for rebalancing the branches of said bridge network located at the respective receiving stations.

12. In a telemetric system, in combination, an inductance bridge network including a pair of inductance coils connected in series across a source of alternating current potential at a transmitting station, a second pair of inductance coils connected in series across said source at a first receiving station, a third pair of inductance coils connected in series across said source at a second receiving station, a first bridge unbalance detector connected across the conjugate points of the bridge defined by the first and second pair of inductance coils, a second bridge unbalance detector connected across the conjugate points of the bridge defined by the first and third pair of inductance coils, movable means at the transmitting station for varying the relative inductance of the coils of the first pair of coils to unbalance the bridge network, means at the several receiving stations responsive to the respective detectors for correspondingly varying the relative inductance of the coils of the second and of the third pair of coils for rebalancing the branches of said bridge network located at the respective receiving stations, and means for controlling the magnitude of the currents traversing said detectors in response to a predetermined movement of said bridge unbalancing means comprising an adjustable inductance connected in parallel with one of the coils of said first pair of inductance coils.

JOHN D. RYDER.